(12) United States Patent
Nalluri et al.

(10) Patent No.: US 9,064,437 B2
(45) Date of Patent: Jun. 23, 2015

(54) MEMORY BASED SEMAPHORES

(71) Applicants: Hema Chand Nalluri, Hyderabad UPPAL (IN); Aditya Navale, Folsom, CA (US)

(72) Inventors: Hema Chand Nalluri, Hyderabad UPPAL (IN); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/707,930

(22) Filed: Dec. 7, 2012

(65) Prior Publication Data
US 2014/0160138 A1 Jun. 12, 2014

(51) Int. Cl.
*G09G 5/36* (2006.01)
*G09G 5/00* (2006.01)
*G06T 1/20* (2006.01)
*G06F 9/52* (2006.01)

(52) U.S. Cl.
CPC ...... *G09G 5/001* (2013.01); *G06T 1/20* (2013.01); *G06F 9/52* (2013.01)

(58) Field of Classification Search
CPC ......... G06F 9/52; G06F 13/14; G06F 15/167; G06F 9/462

USPC ........................................................ 345/556
See application file for complete search history.

(56) References Cited

U.S. PATENT DOCUMENTS

| 5,920,714 | A | 7/1999 | Schiffleger |
| 2003/0033489 | A1 | 2/2003 | Fujiyama |
| 2006/0136640 | A1 | 6/2006 | Tuan |
| 2010/0115249 | A1* | 5/2010 | Paltashev et al. ............ 712/228 |

FOREIGN PATENT DOCUMENTS

WO 01-16741 A2 3/2001

OTHER PUBLICATIONS

Written Opinion of the International Searching Authority for International application No. PCT/US2013/067076.

* cited by examiner

*Primary Examiner* — Hau Nguyen
(74) *Attorney, Agent, or Firm* — Blakely, Sokoloff, Taylor & Zafman LLP

(57) ABSTRACT

Memory-based semaphore are described that are useful for synchronizing operations between different processing engines. In one example, operations include executing a context at a producer engine, the executing including updating a memory register, and sending a signal from the producer engine to a consumer engine that the memory register has been updated, the signal including a Context ID to identify a context to be executed by the consumer engine to update the register.

30 Claims, 6 Drawing Sheets

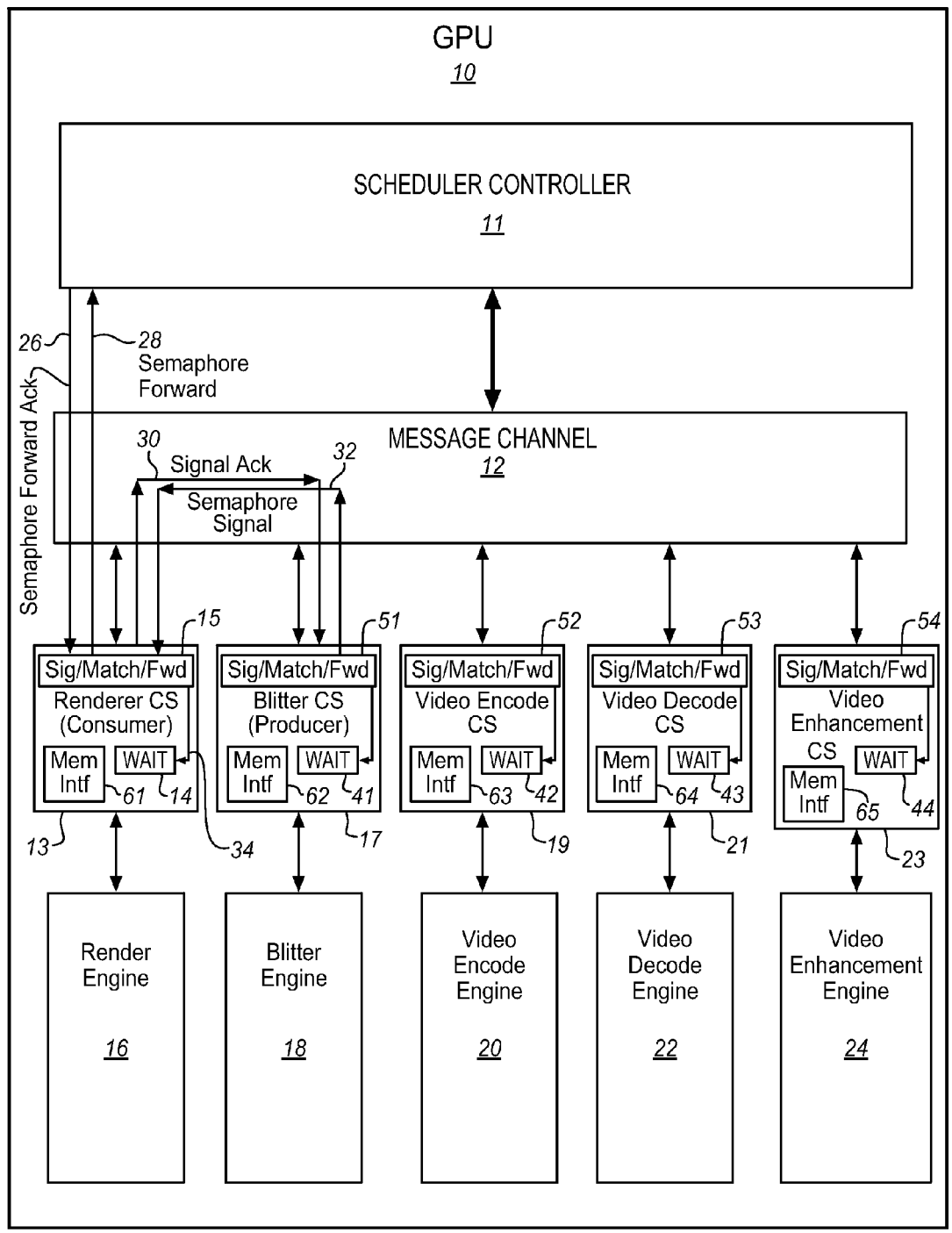

MEMORY BASED SEMAPHORES

FIELD

The present disclosure pertains to the field of synchronizing operations between different processing engines and, in particular, to signaling using semaphores and memory registers.

BACKGROUND

Computing techniques been developed to allow general purpose operations to be performed in a GPU (graphics processing unit). A GPU has a large number of simple parallel processing pipelines that are optimized for graphics processing. By moving general purpose operations that require many similar or identical parallel calculations to the GPU, these operations can be performed more quickly than on the CPU (Central Processing Unit) while processing demands on the CPU are reduced. This can reduce power consumption while improving performance.

The GPU has several different processing engines that are optimized to perform different functions. These engines may include: a Blitter Engine, a Render Engine, a Video Decode Engine, a Video Encode Engine, and a Video Enhancement Engine among others. Each engine process commands within a context that is scheduled by a separate scheduling processor. The scheduling processor assigns contexts to each engine and manages the execution of command streams associated with each context.

However, the processing engines, command buffers and command streamers of GPUs must coordinate the transfer of intermediate values and commands between the different engines. When one engine is producing a value that will be consumed in commands executed by another engine, some mechanism must be used to ensure that the value is ready for the consumer to use. The coordination between the engines can consume significant resources that cannot then be used to execute the commands.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a block diagram of a portion of a graphics processing unit with command streamers and signal according to an embodiment of the invention.

DETAILED DESCRIPTION

Figure 2A:
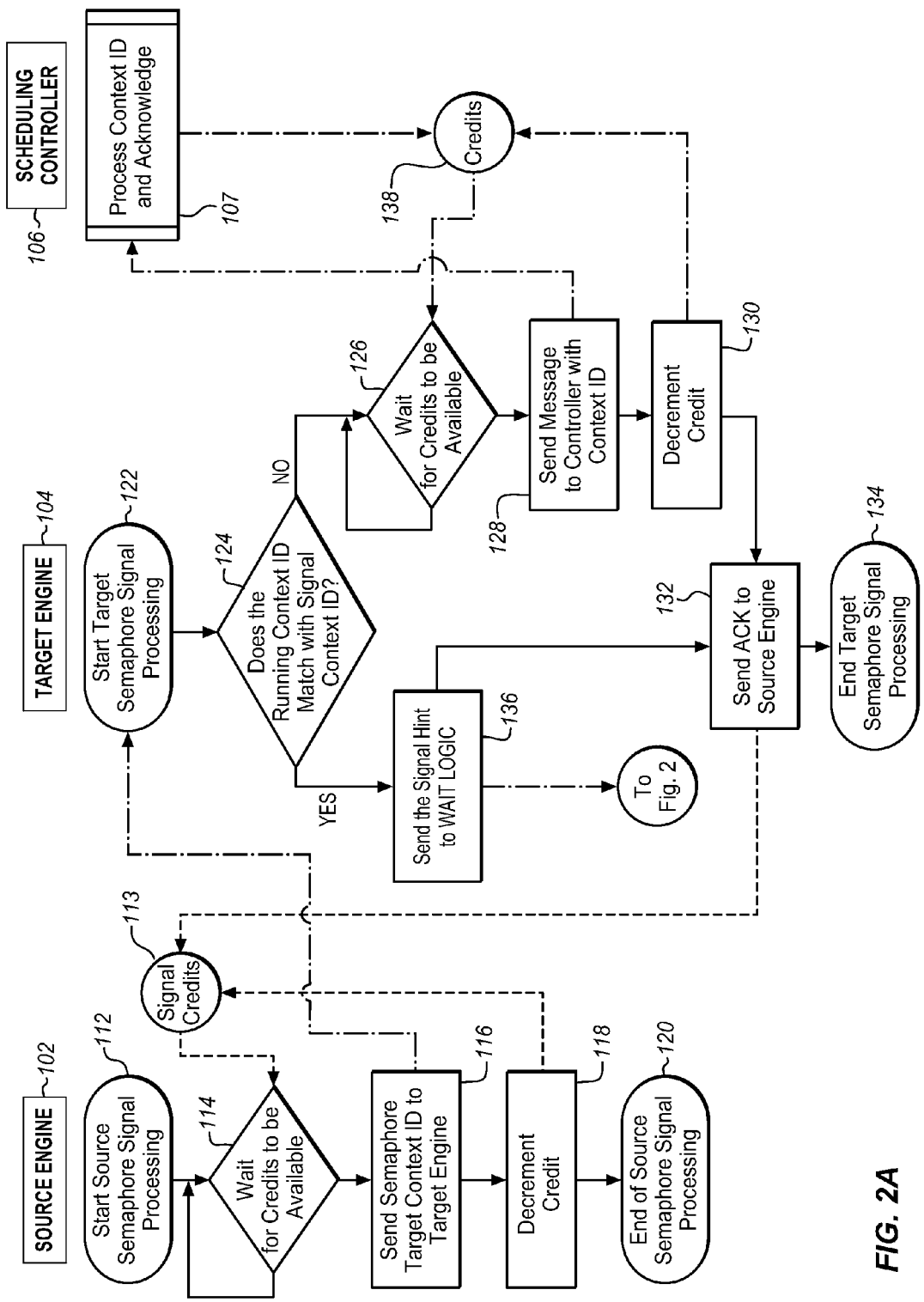
FIG. 2A is a process flow diagram of executing a batch buffer using a predication enable bit according to an embodiment of the invention.

This invention relates to using memory-based signaling to synchronize between engines in a producer/consumer model of memory access for example in a graphics rendering circuit. Memory-based semaphores may be used instead of register-based semaphores in software scheduling modes for communication between multiple contexts running on multiple engines and Host CPUs (Central Processing Unit). The multiple engines may include: a Blitter Engine, a Render Engine, a Video Decode Engine, a Video Encode Engine, and a Video Enhancement Engine among others.

Semaphores may be used to signal different types of information between a data consumer and a data producer. The semaphores may contain addresses, parameters and values. Semaphore commands may be used to use the semaphores. In a producer/consumer model, the semaphore data may be stored in memory. In order to reduce memory access latency, smart ways may be used to determine when and how to sample the semaphore data from memory.

The use of semaphores can be enhanced by including context switching policies on semaphore failure. A programmability interface may also be provided to software. In addition to software assistance, hardware assistance may be provided to the scheduler software for making decisions for effective rescheduling of contexts that are switched out due to a semaphore failure.

When the context is switched out on a semaphore wait being unsuccessful, the semaphore wait command may be updated in a PPHWSP (per process hardware status page) or similar memory space. The PPHWSP is a scratch space in graphics memory that is assigned to a particular context. Each context may have its own PPHWSP or the scratch space may be shared by more than one context. This scratch space can be used as a means of communication between hardware and software and can be used for temporary storage by hardware and software. Before rescheduling a switched out context due to a semaphore wait, the scheduler can read the PPHWSP to re-evaluate the wait condition before submitting the wait condition to hardware. This allows the scheduler to improve hardware use and avoid unnecessary context switches during resubmissions.

As described in more detail below, data in memory locations may be used as a mail box for communication between contexts to synchronize. Synchronization as referred to herein may involve a second context waiting for a first context to clear the first context's dependency before the second context starts executing. For example in a typical producer/consumer model, the consumer waits for the producer to signal completion before the consumer starts making progress. This synchronization can be achieved using, for example a MI_SEMAPHORE_SIGNAL command and MI_SEMAPHORE_WAIT command as described below.

The examples below use a context to manage operations on the hardware resources. Each context may be assigned a unique ID (Identification) by which the context is identified throughout its life time. Contexts are also assigned to an engine on which the context will be run, that is the hardware resource that the context will use. The assignment may based on the workload type at the beginning of the context or on any unique requirements of the context. The context ID and assignment may be fixed so that neither one changes after it is first assigned.

FIG. 1 is a generalized block diagram of a graphics processing unit (GPU) 10. The GPU in this example includes five engines a Render Engine 16, Blitter Engine 18, a Video Encode Engine 20, a Video Decode Engine 22, and a Video Enhancement Engine 24. Each engine is connected to its own command streamer (CS) 13, 17, 19, 21, 23. The engines may also have other connections to memory and other resources (not shown). Each command streamer includes a wait module 14, a signal interface 15, and a memory interface. The memory interface connects to an internal or external shared memory such as the memory 525 of FIG. 5. The communication for semaphore signaling is between these command streamers. The command streamers are all coupled to a message channel 12 and the message channel is coupled to a scheduler controller (SHIM) 11. The scheduler controller is referred to herein alternately as a scheduler, a controller, a microprocessor, and a SHIM. The scheduler controller can take any one of these forms or others, depending on the particular implementation.

As shown, a semaphore signal 32 is sent from a producer, in the illustrated example, the blitter engine through its blitter CS 17 to the consumer engine, in the illustrated example, the render engine. Such a signal may come from any engine to any engine, but in this example is shown as coming from the blitter engine. The signal is carried between command streams by the message channel 12. The consumer engine 16 replies through its command streamer with a signal acknowledgment 30.

The render engine then compares the context ID in the semaphore signal to that of its current context. If it matches, then the wait engine 14 is invoked and if the wait engine is waiting on semaphore wait, then, after waiting, the wait engine will resample the data provided by the producer and reevaluate the condition.

A communication channel 34 is provided between Sig/Match/Fwd block 15 and the Wait fub 14, designated as "Context Match." When the signal is received from a producer CS, here the blitter engine, the consumer CS, here the render engine, matches the context ID received with the current context id and forwards 15 the signal to the WAIT fub 14. If the wait fub is stuck on the wait command it reacquires the memory value through the memory interface after the wait period for another evaluation.

Figure 5:
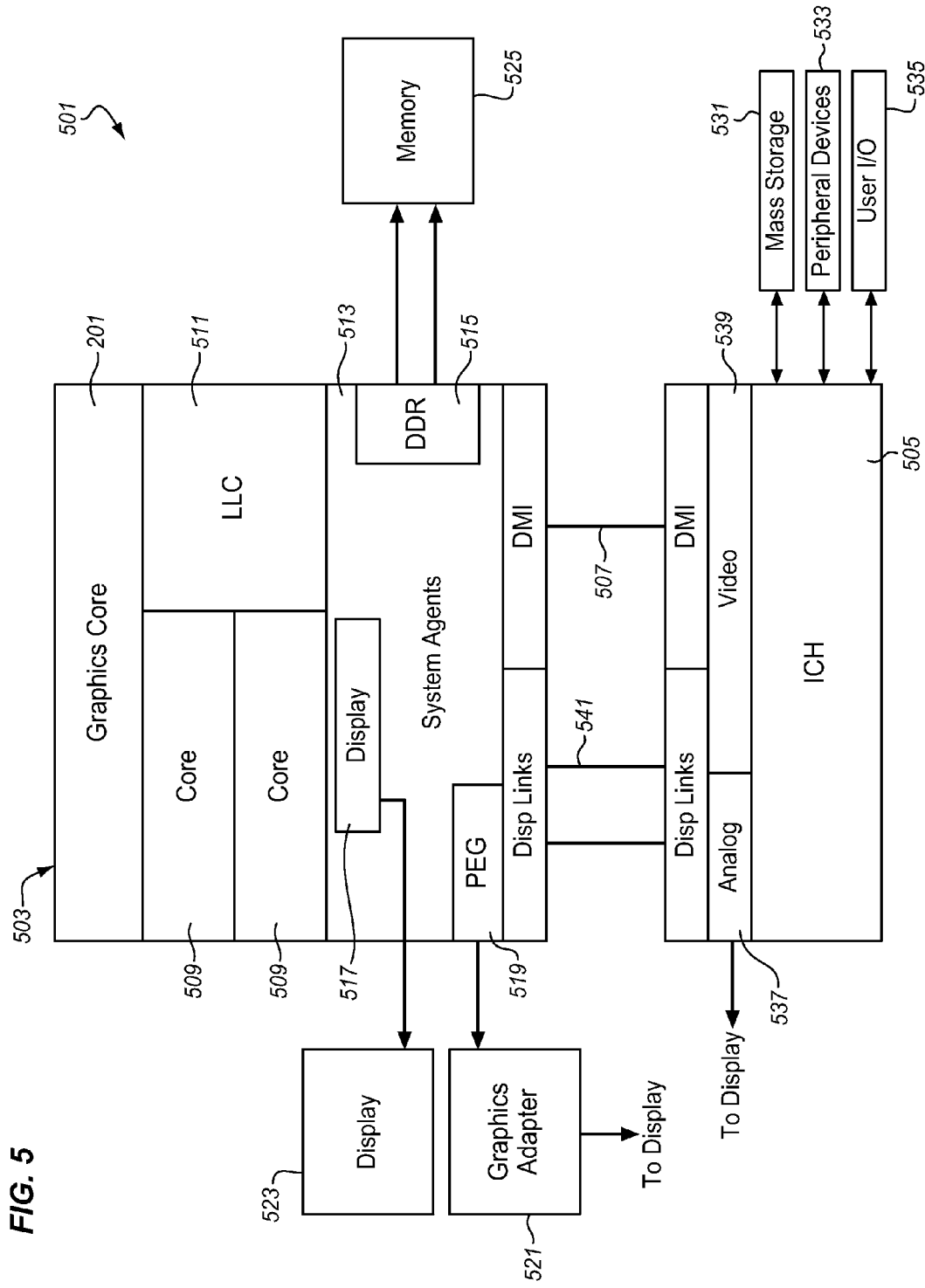
FIG. 5 is a block diagram of a computer system suitable for use with an embodiment of the invention.

The WAIT fub 14, 17, 19, 21, 23 is the logic which executes the MI_SEAMPHORE_WAIT command, described in more detail below. It reads the memory content and evaluates the condition. Later, based on the poll mode or signal mode, the WAIT fub resamples the memory location in the command until the condition is satisfied. FIG. 5 shows a memory interface 515 accessible to the memory locations.

When the context IDs do not match, a semaphore forward signal 28 is sent to the SHIM which replies with a semaphore forward acknowledgement. This allows resources to be allocated to the render engine. This allows the scheduler to look if the context ID received from the command scheduler matches an existing context that has retired due to semaphore wait. The command scheduler will then move the retired context to ready to be re-submitted on the next opportunity.

When the context IDs do not match, then a semaphore forward signal 28 is sent to the SHIM. The SHIM replies with a semaphore forward acknowledgment. This allows resources to be allocated to the render engine. In the present description, producer and source are used interchangeably and consumer and target are used interchangeably. The description herein applies equally to both to the extent that there is any difference between the two terms.

FIG. 2A is a process flow diagram showing operations performed at a source engine 102, a target engine 104 and a microcontroller 106. At the source engine, an example of a producer, the process starts at 112 with signal processing using semaphore signaling. At 114, the source engine waits for credits to be available for use by its context. When the credits become available, the source engine will receive a context ID and an engine assignment. These are then sent at 116 to the target engine 104. The source engine then decrements its credit count at 118, having used credits for the context at 116 and the source engine semaphore signal process ends at 120.

As mentioned above, semaphore signaling allows a Producer-Context to inform a Consumer-Context by stating that one of its semaphores in memory has been updated. This can be done by programming a MI_SEMAPHORE_SIGNAL command, described in more detail below, inside the producer's context command sequence following an instruction updating the semaphore in memory. The MI_SEMPHPHORE_SIGNAL command carries the consumer context-ID and details of the assignment of the engine on which the context will be executed.

As a producer, any engine that is operating within a context will generate a signal message to a consumer upon executing a MI_SEMAPHORE_SIGNAL command. The producer generates the signal message to the engine that is mentioned in the command. The signal will contain the consumer's Context-ID. This corresponds to the process flow at 116 in which the semaphore target context ID is sent to the target engine.

As a consumer, any engine on receiving the signal message processes the message and acknowledges the signaling engine. The consumer context-ID that is received in the semaphore signal message is compared with the context-IDs for the processes that the engine is currently executing. A match and mismatch decision will be taken based on this comparison. If there is no active context running on the engine, then this may be treated as a mismatch.

In FIG. 2A, a process of target semaphore signal processing starts 122 at the target engine 104. At 124, the target engine makes a comparison to determine whether the running context ID matches the context ID that was received in the semaphore signal from the source engine. If there is a match, then at 136 a signal is sent to semaphore wait logic at 158. This signal may or may not include the target semaphore address depending on the implementation. The address may be used to optimize redundant memory reads, for example. After the wait logic indicates that the wait has been completed, then the target engine executes the next instruction in the context. Alternatively, if the context is not waiting on semaphore wait, the semaphore signal may be dropped by semaphore wait fub. In case semaphore fub is waiting on semaphore wait then the incoming signal will trigger semaphore wait fub to resample the memory location and evaluate the wait condition If the context ID does not match, then the signal is forwarded. When the Consumer Context-ID received in the semaphore signal does not match an ID for a running context, then the received context ID is messaged to a scheduler 106. The scheduler processes the data and reschedules the Context reported accordingly. This is indicated at 126 in which the target engine waits for credits to be available. The credits are used to ensure that resources are available to handle the operations that follow the semaphore signaling. When the credits are available, then at 128 a message is sent to the scheduler 106 with the context ID that does not match.

The credits are then decremented at 130 to support the operation and an acknowledgment is sent back to the source engine at 132. Upon sending the acknowledgment, the semaphore signal processing at the target engine ends at 134. The context is then executed at the target engine and any results are placed in memory. There may be many engines in the system. As a result, there may be multiple producers and consumers messaging each other using semaphore signaling. In the process flow of FIG. 2A, this is managed with a credit-based flow mechanism for messaging between engines.

Figure 2B:
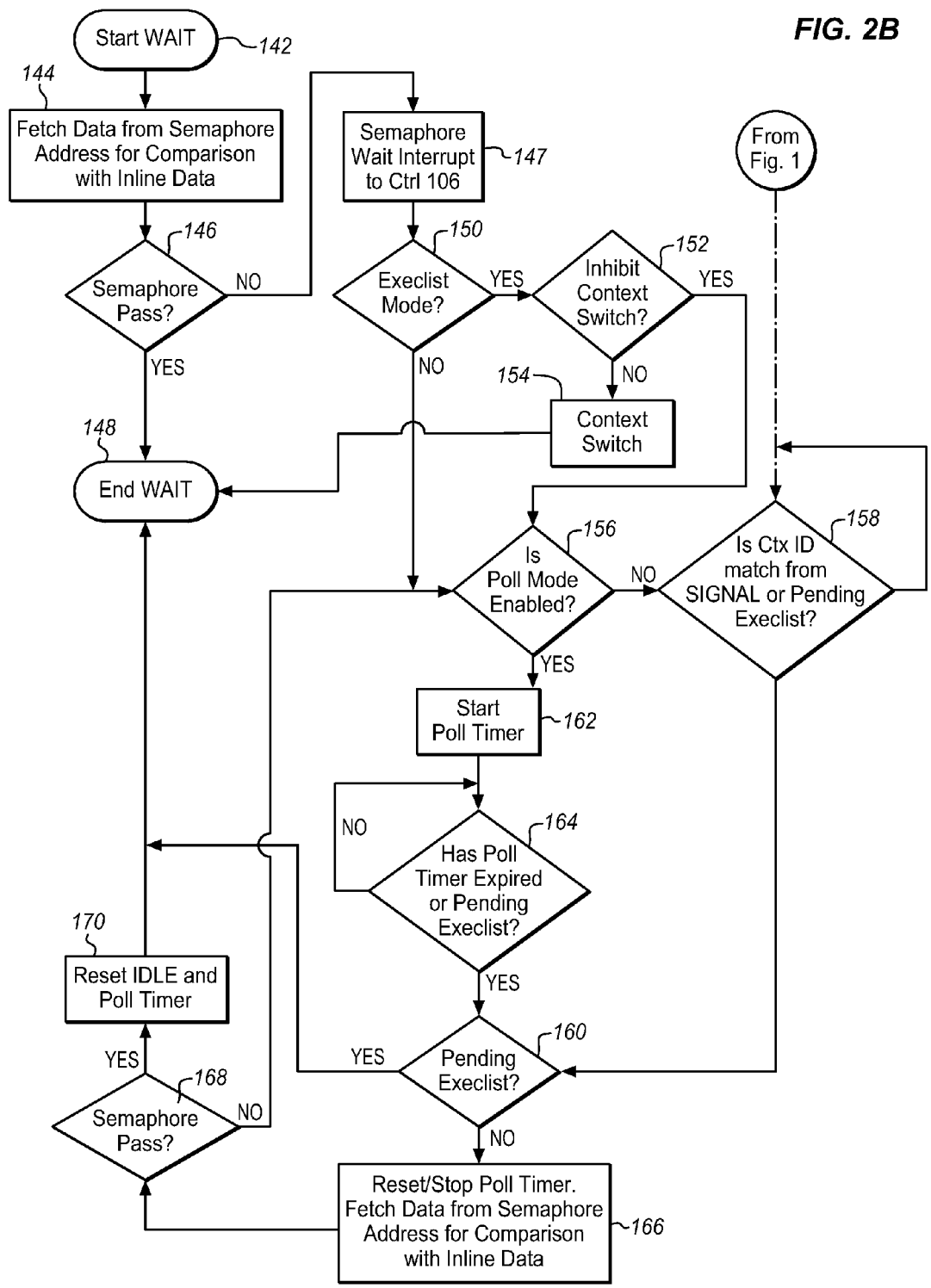
FIG. 2B is a process flow diagram of refreshing values in a predicate register according to an embodiment of the invention.

The microcontroller 106 manages resource allocation using a credit system. In one example, the microprocessor is an interface between the microcontroller and the other engines. This hardware component enables communication between other engines and the micro controller and vice versa. In some implementations, it is referred to a SHIM 106. It processes Context IDs and acknowledges the requests. As shown in FIG. 2B, it receives requests for credits at 128 with Context IDs. It manages credits in a register 138 that may be a part of or separate from the microprocessor to provide credits 126 or to receive credits 130. While the illustrated embodiment is shown in the context of managing processes using credits, other forms of resource allocation may be used as an alternative.

Semaphore wait as shown in the process flow diagram of FIG. 2B, allows the execution of a context by any designated engine to be halted at a precise time during the command stream execution. The engine is prevented from making forward progress from a precise location in the command stream until a desired value is updated in a pre-assigned memory location. In the described example, this is achieved by placing an MI_SEMAPHORE_WAIT command in the executed command stream. The MI_SEMAPHORE_WAIT command carries a semaphore memory address, inline semaphore data and a comparison operator. Upon executing the MI_SEMAPHORE_WAIT command in the command stream the engine fetches data from the semaphore memory address indicated by the command and then compares the data with the inline semaphore data.

Referring to FIG. 2B, the wait processing starts at 142 and at 144 the engine fetches data from the semaphore address for comparison with the inline data. At 146, the data is compared and, if the data matches, then the wait process ends at 148.

If the comparison passes at 146, then the engine moves to the next instruction that follows the wait command. On the other hand, if the comparison fails, then the target engine determines how to further proceed. In the example of FIG. 2B, it first determines at 150 if the wait process is in execlist (execution list) mode. If yes, then at 152, it is determined whether a context switch is inhibited.

In execlist-based scheduling, a Target Context ID field contains the Context ID corresponding to the context of the target engine that the command is signaling. The target engine waiting on the MI_SEMPHORE_WAIT command in signal mode will re-fetch the data from memory or comparison if its context ID is same as this signaled Context ID.

When Execlist is enabled at 150 and the inhibit context switch is not enabled at 152, the target engine switches out the context at 154 and informs the scheduler processor or SHIM 106 that the reason for the context switch is a semaphore wait failure. On a semaphore wait leading to a context switch, the CS inserts the MI_SEMAPHORE_WAIT command details in the context image, so that the scheduler can reevaluate the condition before rescheduling the context.

In another mode of operation, if the context switch is inhibited at 152, instead of switching the context on semaphore failure, the wait engine waits for the semaphore condition to be satisfied. In order to move forward the wait engine reacquires the semaphore data in memory until the condition from the semaphore command is satisfied. A mode bit in the MI_SEMAPHORE_WAIT command states when the semaphore data needs to be reacquired from memory.

FIG. 2B shows a polling-based mechanism starting at block 156. The wait engine acquires 166 the semaphore data in memory periodically and evaluates 168 the comparison. This goes on until the condition is satisfied. The periodicity at 164 of the sampling of the semaphore data can be configured.

FIG. 2B also shows a signal-based mechanism at 158. The wait engine acquires the semaphore data in memory whenever it receives a semaphore signal. This can come, for example, from the target engine 104 at 136 when the running Context ID matches the signal Context ID. On a semaphore failure, the NO path from 146, a semaphore wait interrupt is generated at 147 indicating an engine has encountered a semaphore failure and, if needed, the semaphore wait can be canceled and preempt the context from execution. In other words, irrespective of the mode, when the semaphore fails on the very first time, an interrupt is send to the scheduler.

Another scheduling mode is a ring buffer mode. In a ring buffer mode of scheduling, the target engine's Context ID field doesn't have any relevance. A target engine waiting on the MI_SEMAPHORE_WAIT command in the signal mode will fetch data from memory for comparison on receiving the signal irrespective of the Context ID that it received. The MI_SEMAPHORE_WAIT and MI_SEMPHORE_SIGNAL commands are both executed in the same way in ring buffer mode as in the execlist mode and affect the target engine similarly. However the failure of a semaphore wait might result in a context switch in the execlist mode where as it will not result in a context switch in the ring buffer mode.

Returning to the polling mode, there may be no support for an MI_SEMAPHORE_SIGNAL or similar command. In FIG. 2B, if the wait engine is not in execlist mode at 150, then it is determined at 156 if the wait engine is in a poling mode. If it is, then the hardware periodically samples the memory and reevaluates the semaphore condition.

This is shown, for example, as starting a poll timer at 162, and monitoring the timer state at 164. When the timer expires, the wait engine checks for a pending execlist at 160. If the list is found, then the wait is ended at 148. If it is not, then the poll timer is stopped at 166. At this point, since there are no pending execlists, the wait engine fetches the data from the address provided by the semaphore command and compares it to the inline data at 168. If there is a match at 168, then the IDLE state and the poll timer are reset at 170 and the wait is ended at 148. On the other hand, if there is no match, then the polling mode returns to start the poll timer at 162. Another timer cycle is started and the polling mode cycles through again.

In the signal-based mode, the re-evaluate semaphore wait hint is sent to the wait logic at 136 of FIG. 2A. On receiving the hint at 158, the context ID is checked from a match from the hint and from the pending execlist. If there is a wait process pending and if there is no pending execlist at 160, then the semaphore is reacquired from memory at 166 and re-evaluated. On a semaphore pass 168, the wait process is terminated at 148. On a semaphore failure at 168, the process goes back through 156 to wait for the next signal hint 158.

The MI_SEMAPHORE_SIGNAL command used above may be defined as a command to signal the target engine and to state the memory semaphore update occurrence to one of the target engine's contexts using a Target Context ID. In embodiments, the MI_SEMPHORE_SIGNAL command and an additional MI_SEMAPHORE_WAIT command may together replace mailbox and register-based semaphore signaling. An MI_ATOMIC (non-posted) command may be programmed prior to the MI_SEMAPHORE_SIGNAL command to update the semaphore data in memory.

In some cases, based for example on information contained in bits of the command, the MI_SEMAPHORE_SIGNAL command may be executed as a pipelined PIPE_CONTROL flush command with a semaphore signal as a post sync operation. Flush completion only guarantees that the workload prior to this command is pushed out to a windower unit and that any outstanding flushes that were issued prior to this command are completed. The signal may be saved as a post sync operation. The command streamer may in this case continue executing other commands. Atomic operations saved as post sync operation may be executed at some point later after completion of the issued flush command.

In this post sync operation mode, the atomic semaphore signal operation will be out of order with the rest of the MI commands programmed in the ring buffer or batch buffer. However, the atomic semaphore signal operation will be in order with respect to the post sync operations resulting due to any PIPE_CONTROL command. An example structure for an MI_SEMAPHORE_SIGNAL command is shown in Table 1. Any one or more of the fields may be replaced with other fields. The order of fields may be changed and more or fewer fields may be used with more or fewer bits.

TABLE 1

MI_SEMAPHORE_SIGNAL

| DWord | Bit | Description |
|---|---|---|
| 0 | 31:29 | Command Type<br>Default Value: 0h MI_COMMAND<br>Format: OpCode |
| 0 | 28:23 | MI Command Opcode<br>Default Value: 1Bh MI_SEMAPHORE_SIGNAL<br>Format: OpCode |
| 0 | 22 | Reserved |
| 0 | 21 | Post Sync Operation<br>0h: No Post Sync Operation<br>1h: Post Sync Operation |
| 0 | 20:18 | Reserved |
| 0 | 17:15 | Target Engine Select<br>Selects the target engine to which SIGNAL will be sent |
| 0 | 14:8 | Reserved |
| 0 | 7:0 | DWord Length<br>Default Value: 1h<br>Format: =n |
| 1 | 31:0 | Target Context ID<br>In execlist mode this contains the Context ID for the target engine that this command signals |

The MI_SEMAPHORE_WAIT command can take a variety of different forms depending on the particular system and standards with which it is to be used. In one example, this command supports memory based semaphore wait as shown for example in FIG. 2B. Memory based semaphores may be used for synchronization between the producer and the consumer contexts. Producer and consumer contexts could be running on different engines or on the same engine inside a graphics processing system. In one embodiment, the two contexts can run on the same engine when execlist is enabled on both. With the command as described here, the producer context implements a signal and the consumer context implements a wait.

On parsing this command, the command streamer fetches data from the semaphore address mentioned in this command and compares it with the inline semaphore data Dword. If the comparison passes, then the command streamer moves to the next command. The command streamer always generates an interrupt to the scheduler on encountering a semaphore failure.

When execlists are enabled, if the comparison fails, then the command streamer switches out the context. The context switch can be inhibited by setting "Inhibit Synchronous Context Switch" in, for example, a GFX_MODE register.

In a ring buffer mode of scheduling or Execlist with "Inhibit Synchronous context Switch" set, if the comparison fails, then the command streamer evaluates a compare operation based on the wait mode until the compare operation is true or until wait is canceled by software.

An example structure for an MI_SEMAPHORE_WAIT command is shown in Table 2. Any one or more of the fields may be replaced with other fields. The order of fields may be changed and more or fewer fields may be used with more or fewer bits. In the Compare Operation, SAD corresponds to Semaphore Address Data and SDD corresponds to Semaphore Data Dword.

TABLE 2

MI_SEMAPHORE_WAIT

| DWord | Bit | Description |
|---|---|---|
| 0 | 31:29 | Command Type<br>Default Value: 0h MI_COMMAND<br>Format: OpCode |
| 0 | 28:23 | MI Command Opcode<br>Default Value: 1Ch MI_SEMAPHORE_WAIT<br>Format: OpCode |
| 0 | 22 | Memory Type: (When executing from a non-privileged batch buffer memory type may be ignored.)<br>This bit must be 1if the Per Process GTT Enable bit is clear.<br>0h: Per process graphics address<br>1h: Global graphics address (The global GTT translates the address executing this command from a privileged (secure) batch buffer) |
| 0 | 21:16 | Reserved |
| 0 | 15 | Wait Mode: (Specifies the WAIT behavior when the semaphore comparison fails and before the context is switched out.)<br>1h: Polling mode (The semaphore data is periodically read from memory for comparison until it is context switched out. Periodicity is set in a register such as a SEMA_WAIT_POLL register.)<br>0H: Signal Mode (The semaphore data is reacquired from memory on receiving SIGNAL with the same Context ID. In ring buffer mode of scheduling Context ID associated with SIGNAL is ignored and always treated as a match.) |
| 0 | 14:12 | Compare Operation: (Specifies the operation that will be executed to create the result that will either allow the context to continue or wait.) |

TABLE 2-continued

MI_SEMAPHORE_WAIT

| DWord | Bit | Description |
|---|---|---|
| | | 0h: SAD > SDD (If Indirect fetched data is greater than inline data then continue.) |
| | | 1h: SAD >= SDD (If Indirect fetched data is greater than or equal to inline data then continue.) |
| | | 2h: SAD < SDD (If Indirect fetched data is less than inline data then continue.) |
| | | 3h SAD <= SDD (If Indirect fetched data is less than equal to inline data then continue.) |
| 0 | 11:8 | Reserved |
| 0 | 7:0 | DWord Length: Default Value: 1h Format: =n |
| 1 | 31:0 | Semaphore Data DWord: (This Data DWord controls execution of the command buffer. If the data at Semaphore Address is greater than this DWord, the execution of the command buffer continues.) Format: U32 |
| 2 | 31:0 | Semaphore Address: (This is the graphics memory address of the 32-bit value of the semaphore |
| 3 | 31:0 | Semaphore 64-bit Address: (This field specifies a 4 GB aligned base address of a graphics 4 GB virtual address space within the host's 64-bit virtual address space.) |

Figure 3:
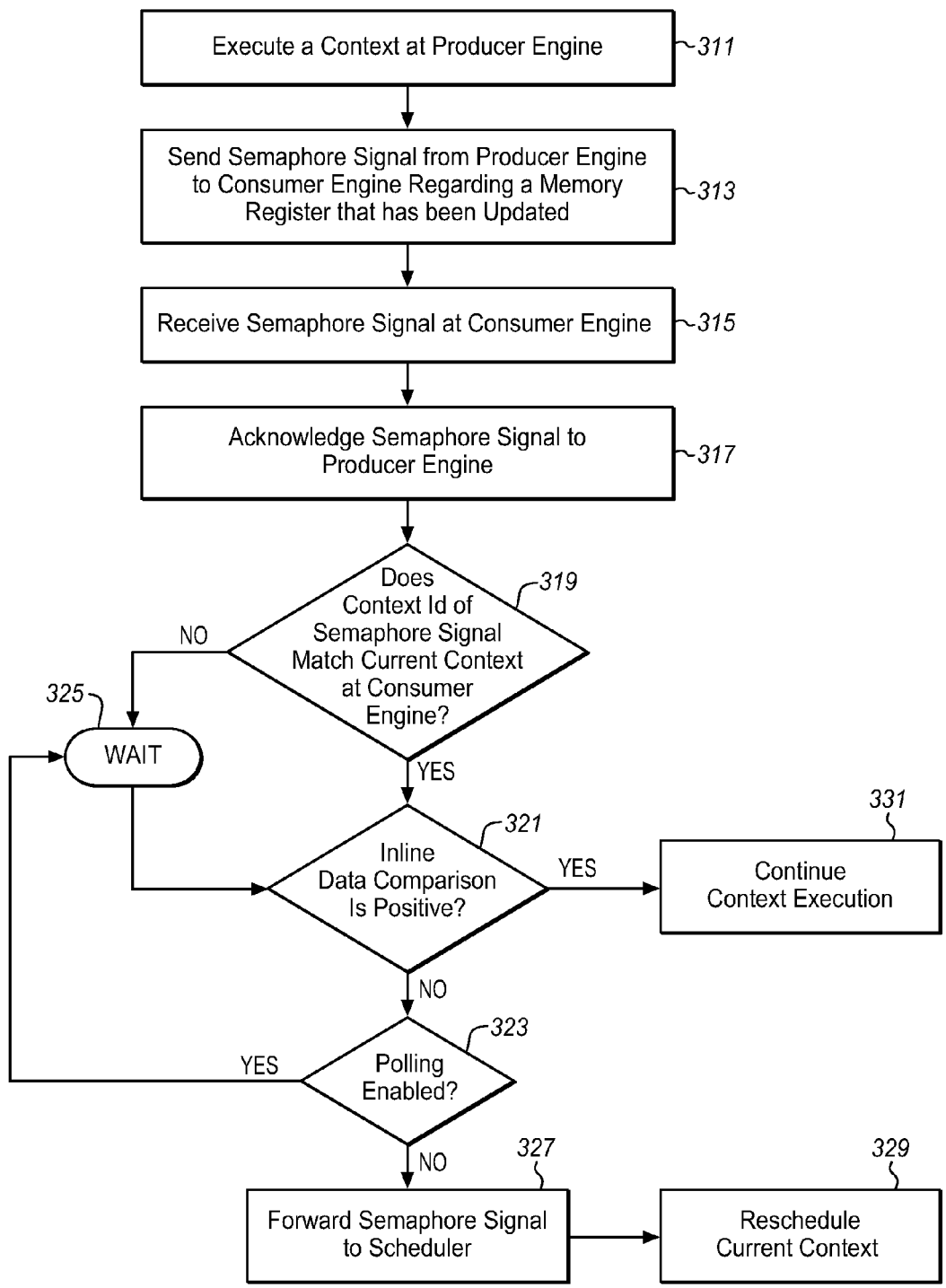
FIG. 3 is a hardware logic diagram of an arithmetic logic unit with a predication enable bit register according to an embodiment of the invention.

FIG. 3 is an alternative process flow diagram of a method to synchronize contexts between a producer and a consumer engine according to embodiments described above. At 311, a producer engine executes a context. The context has a command stream and the producer executes the commands in the stream. Upon reaching a semaphore signal command, the producer at 313 sends a semaphore signal to a consumer engine. Using multiple semaphore commands in the command stream, the producer may send multiple semaphore signals to one or more consumers. The contents of the semaphore signal may be provided by the command or it may be obtained in other ways. The command may include an identification of the context that the signal affects, an identification of the consumer or target engine and various other processing detail and options.

The semaphore signal may include only a context identifier or it may include other information, for example, the affected memory register that the producer has updated using, for example, a memory address, and action to take in response to receiving the semaphore signal. The semaphore signal may be sent after the producer engine updates a memory register or after it has produced some other result that the consumer engine needs.

In one example, the semaphore signal includes inline data and a comparison operation. The comparison operation may be greater than, less then, equal to, or any of a variety of more complex functions. The comparison is to be applied to the inline data in the signal against data at the updated memory address. This allows the consumer engine to determine whether the data in the updated memory address has been updated.

At 315 the consumer engine receives the semaphore signal and at 317, it acknowledges the signal to the producer engine. Having received the signal, the consumer engine can then process the commands of the signal. First at 319, the consumer engine determines whether the Context ID of the semaphore signal matches a Context ID of the context that is currently being processed at the consumer engine. If it does then the consumer applies the comparison operation at 321. If the comparison operation checks out then the consumer engine continues executing the current context at 331. The semaphore signal amounts to a check that the data is ready for the consumer engine to use in executing the commands of the context.

If the comparison operation does not check out, then the consumer may wait for the producer to update the register. The producer can control this by indicating in the semaphore signal whether to wait. If polling is enabled in the semaphore signal or in some other way at 323, then the consumer engine at 325 will wait. The wait may be a simple timer or a more complex operation as shown in FIG. 2B. In another embodiment the wait requires the consumer engine to wait for a semaphore signal from a producer. If the data meets the comparison after a wait at 321, then at 331 the consumer continues to execute the context.

If the comparison is negative at 321 and polling is not enabled at 323 or if the Context ID of the semaphore signal does not match the current context at 19, then the consumer will end the current context and go to the next one that it receives from the command streamer. To do this, it informs a scheduler that there was no match at 327. The scheduler will reschedule that context with the same or a different consumer engine.

Figure 4:
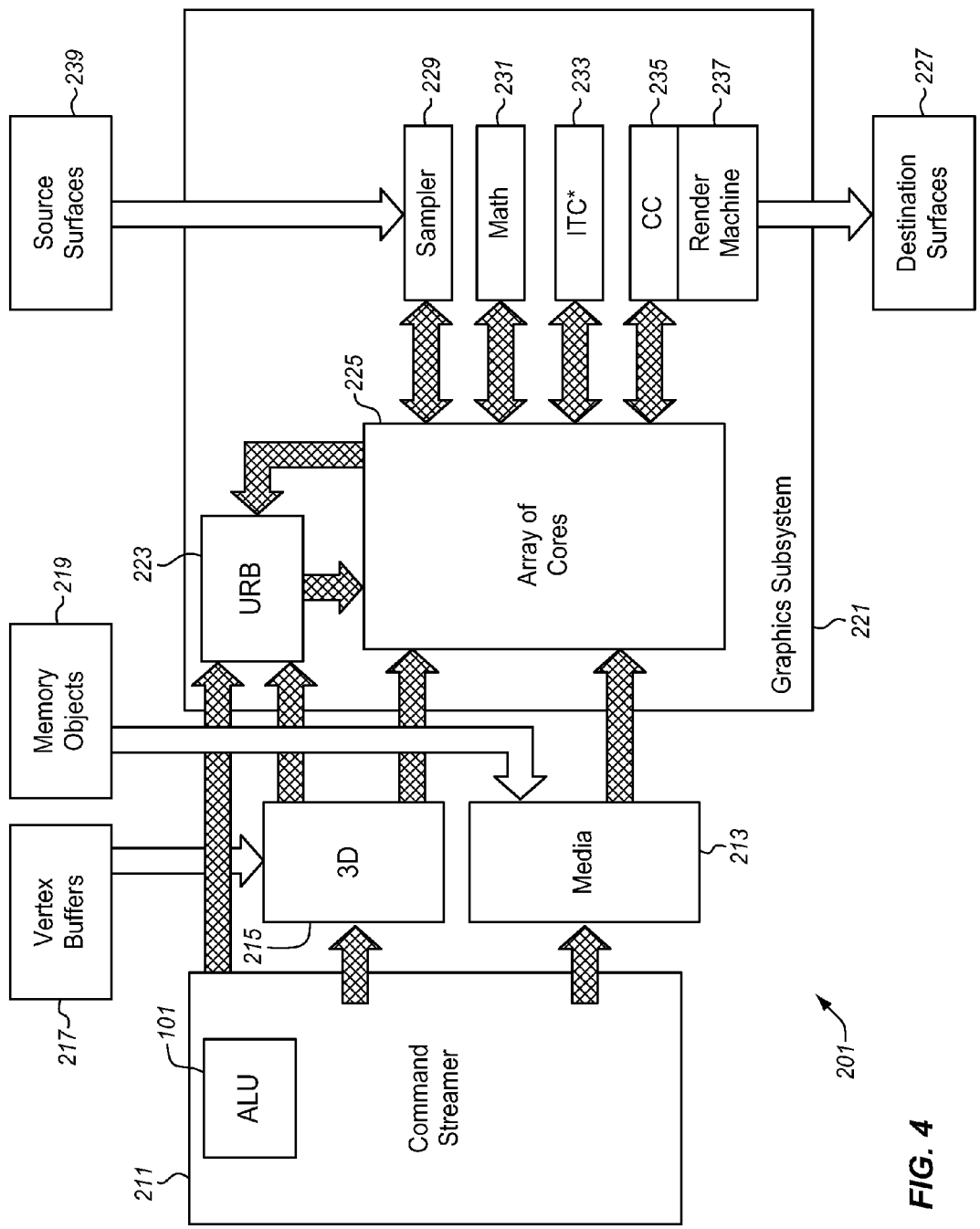
FIG. 4 is a block diagram of a portion of a graphics processing unit suitable for use with an embodiment of the invention.

FIG. 4 is a generalized hardware diagram of a graphics processing unit suitable for use with the present invention. The GPU 201 includes a command streamer 211 which contains an ALU 101. Data from the command streamer is applied to a media pipeline 213. The command streamer is also coupled to a 3D fixed function pipeline 215. The command streamer manages the use of the 3D and media pipelines by switching between the pipelines and forwarding command streams to the pipeline that is active. The 3D pipeline provides specialized primitive processing functions while the media pipeline performs more general functionality. For 3D rendering, the 3D pipeline is fed by vertex buffers 217 while the media pipeline is fed by a separate group of memory objects 219. Intermediate results from the 3D and media pipelines as well as commands from the command streamer are fed to a graphics subsystem 221 which is directly coupled to the pipelines and the command streamer.

The graphic subsystem 221 contains a unified return buffer 223 coupled to an array of graphics processing cores 225. This is referred to above as producer engines and consumer engines. The unified return buffer contains memory that is that is shared by various functions to allow threads to return data that later will be consumed by other functions or threads. The array of cores 225 processes the values from the pipeline streamers to eventually produce destination surfaces 227. The array of cores has access to sampler functions 229, math functions 231, inter-thread communications 233, color calculators 235, and a render cache 237 to cache finally rendered surfaces. A set of source surfaces 239 is applied to the graphics subsystem 221 and after all of these functions 229, 231, 235, 237, 239 are applied by the array of cores, a set of destination surfaces 227 is produced. For purposes of general purpose calculations, the command streamer 211 and ALU are used to run operations to only the ALU or also through the array of cores 225, depending on the particular implementation.

Referring to FIG. 5, the graphics core 201 is shown as part of a larger computer system 501. The computer system has a CPU 503 coupled to an input/output controller hub (ICH) 505 through a DMI (Direct Media Interface) 507. The CPU has one or more cores for general purpose computing 509 coupled to the graphics core 201 and which share a Last Level Cache 511. The CPU includes system agents 513 such as a memory interface 515, a display interface 517, and a PCIe interface 519. In the illustrated example, the PCIe interface is for PCI express graphics and can be coupled to a graphics adapter 521 which can be coupled to a display (not shown). A second or alternative display 523 can be coupled to the display module of the system agent. This display will be driven by the graphics core 201. The memory interface 515 is coupled to system memory 525.

The input/output controller hub 505 includes connections to mass storage 531, external peripheral devices 533, and user input/output devices 535, such as a keyboard and mouse. The input/output controller hub may also include a display interface 537 and other additional interfaces. The display interface 537 is within a video processing subsystem 539. The subsystem may optionally be coupled through a display link 541 to the graphics core of the CPU.

A wide range of additional and alternative devices may be coupled to the computer system 501 shown in FIG. 5. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

While the graphics core 201 is shown as integrated with the CPU that also includes general processing cores 509 and other components, the graphics core may be constructed as a separate component with communication interfaces to the LLC and general purpose cores. Alternatively, the graphics core and its related components as shown, e.g. in FIG. 4 may be constructed on a separate die that is enclosed in the same or a different package. Other components, such as the memory 525, ICH 505 and system agents 513 may also be constructed on the same or different dies in the same or different packages.

Embodiments of the present invention provide a mechanism in a producer engine and a consumer engine to synchronize data in a shared memory using signaling. In the described example, this is done using a MI_SEMAPHORE_SIGNAL command and a MI_SEMAPHORE WAIT command, however, the invention is not so limited. This provides a signal and command mechanism in a command streamer, a hardware structure, to perform arithmetic and logical operations by means of a command, programmed into a command stream executed by cores in the array of cores.

A wide range of additional and alternative devices may be coupled to the computer system 501 shown in FIG. 5. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

It is to be appreciated that a lesser or more equipped system than the examples described above may be preferred for certain implementations. Therefore, the configuration of the exemplary systems and circuits may vary from implementation to implementation depending upon numerous factors, such as price constraints, performance requirements, technological improvements, or other circumstances.

Embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. Specifics in the examples may be used anywhere in one or more embodiments. In one embodiment, a method to synchronize contexts between a producer engine and a consumer engine comprises executing a context at a producer engine, the executing including updating a memory register, and sending a signal from the producer engine to a consumer engine that the memory register has been updated, the signal including a Context ID to identify a context to be executed by the consumer engine to update the register.

Further embodiments include the above method wherein the signal includes a memory register address to identify the updated memory register inline data.

Further embodiments include the above methods also including generating the signal to be sent from a producer engine to a consumer engine, the message identifying the consumer engine and a context ID to which the signal is to be applied by the consumer engine.

Further embodiments include the above methods also including generating the Context ID at a scheduler and assigning the Context ID to the consumer engine, the Context ID including an engine ID to identify the consumer engine.

Further embodiments include the above methods also including receiving the signal at the consumer engine and acknowledging the signal by the consumer engine to the producer engine.

Further embodiments include the above methods also including determining whether the Context ID of the signal matches a Context ID of a context currently being processed at the consumer engine.

Further embodiments include the above methods also including forwarding the signal to a scheduler if the context ID of the signal message does not match the context currently being processed by the consumer engine.

Further embodiments include the above methods also including rescheduling the context identified by the Context ID of the signal message at the scheduler if the context ID of the signal message does not match the context currently being processed by the consumer engine.

Further embodiments include the above methods also including waiting at the consumer engine if the Context ID of the signal message matches the context currently being processed by the consumer engine. Further embodiments include any of the above methods wherein waiting comprises waiting for a timer.

Further embodiments include the above methods also including fetching data from the memory register for use in executing the context at the consumer engine if the Context ID of the signal message matches the context currently being processed by the consumer engine.

In one embodiment, a machine-readable medium having instructions that when executed by the machine cause the machine to perform operations comprises executing a context at a producer engine, the executing including updating a memory register, and sending a signal from the producer engine to a consumer engine that the memory register has been updated, the signal including a Context ID to identify a context to be executed by the consumer engine to update the register.

Further embodiments include the above instructions also including the signal to be sent from a producer engine to a consumer engine, the message identifying the consumer engine and a context ID to which the signal is to be applied by the consumer engine.

Further embodiments include the above instructions also including generating the Context ID at a scheduler and assigning the Context ID to the consumer engine, the Context ID including an engine ID to identify the consumer engine.

In one embodiment an apparatus comprises a producer engine to execute a context including updating a memory register and to send a signal to a consumer engine that the memory register has been updated, the signal including a Context ID to identify a context to be executed by the consumer engine to update the register, and a consumer engine to receive the signal and to acknowledge the signal to the producer engine.

Further embodiments include the above apparatus wherein the consumer engine is further to determine whether the Context ID of the signal matches a Context ID of a context currently being processed at the consumer engine.

Further embodiments include the above apparatus wherein the consumer engine is further to fetch data from a memory register for use in executing the context at the consumer engine if the Context ID of the signal message matches the context currently being processed by the consumer engine.

In one embodiment a method to synchronize contexts between a producer engine and a consumer engine comprises executing a command stream of a context, the command stream having a wait command, the wait command having a semaphore memory address, inline semaphore data and a comparison operator, executing the wait command by fetching data from the semaphore memory address and comparing it with the inline semaphore data, and executing the next instruction in the command stream if the comparison of the comparison operator is met.

Further embodiments include the above methods also including waiting and repeating fetching data and comparing if the comparison is not met.

Further embodiments include any of the above methods wherein waiting comprises waiting for a timer.

Further embodiments include any of the above methods wherein waiting comprises waiting to receive a semaphore signal from a producer engine.

Further embodiments include the above methods also including switching out of the context if the comparison is not met.

Further embodiments include the above methods also including informing a scheduler if the comparison is not met.

Further embodiments include the above methods also including updating the wait command in a context scheduler.

Further embodiments include the above methods also including re-evaluating the wait condition at a scheduler before switching the context of the consumer engine.

In one embodiment, a machine-readable medium having instructions that when executed by the machine cause the machine to perform operations comprises executing a command stream of a context, the command stream having a wait command, the wait command having a semaphore memory address, inline semaphore data and a comparison operator, executing the wait command by fetching data from the semaphore memory address and comparing it with the inline semaphore data, and executing the next instruction in the command stream if the comparison of the comparison operator is met.

Further embodiments include the above instructions also including informing a scheduler if the comparison is not met.

Further embodiments include the above instructions also including updating the wait command in a context scheduler.

In one embodiment, an apparatus comprises a memory having addresses, a command streamer having a command stream for a context, and a consumer engine to execute the command stream of the context, the command stream having a wait command, the wait command having a semaphore memory address to the memory, inline semaphore data and a comparison operator, the consumer engine further to execute the wait command by fetching data from the memory at the semaphore memory address and compare the fetched data with the inline semaphore data, the consumer engine further to execute a next instruction in the command stream if the comparison of the comparison operator is met.

Further embodiments include any of the above apparatuses also including a scheduler connected to the consumer engine to update the wait command if the comparison is not met. In further embodiments the scheduler further re-evaluates the wait condition before switching the context of the consumer engine.

What is claimed is:

1. A method to synchronize contexts between as producer engine and a consumer engine, the method comprising:
   executing a context at a producer engine, the executing including updating as memory register; and
   sending a signal from the producer engine to a consumer engine that the memory register has been updated, the signal including a Context ID to identify a context to be executed by the consumer engine to update the register;
   determining at the consumer engine whether the Context ID of the signal matches a Context ID of a context currently being processed at the consumer engine; and
   waiting at the consumer engine if the Context ID of the signal message matches the context currently being processed by the consumer engine.

2. The method of claim 1, wherein the signal includes a memory register address to identify the updated memory register inline data.

3. The method of claim 1, further comprising generating the signal to be sent from a producer engine to a consumer engine, the message identifying the consumer engine and a context ID to which the signal is to be applied by the consumer engine.

4. The method of claim 3, further comprising generating the Context ID at a scheduler and assigning the Context ID to the consumer engine, the Context ID including an engine ID to identify the consumer engine, 5. The method of claim 1, further comprising receiving the signal at the consumer engine and acknowledging the signal by the consumer engine to the producer engine.

6. The method of claim 1, further comprising forwarding the signal to a scheduler if the context ID of the signal message does not match the context currently being processed by the consumer engine.

7. The method of claim 6, further comprising rescheduling the context identified by the Context ID of the signal message at the scheduler if the context ID of the signal message does not match the context currently being processed by the consumer engine.

8. The method of claim 1, wherein waiting comprises waiting for a timer.

9. The method of claim 1, further comprising fetching data from the memory register for use in executing the context at the consumer engine if the Context ID of the signal message matches the context currently being processed by the consumer engine.

10. The method of claim 9, further comprising receiving a wait hint at the consumer engine and in response to the wait hint fetching data from a semaphore memory address and comparing the fetched data with the inline semaphore data in the wait hint.

11. The method of claim 9, further comprising flushing a pipeline in response to the signal message and executing the context corresponding to the matching Context ID.

12. The method of claim 1, further comprising waiting for a credit to be available from a scheduler before executing the context, adding the available credit to a credit count, and decrementing the credit count after sending the signal.

13. A non-transitory machine-readable medium having instructions that when executed by the machine cause the machine to perform operations comprising;
   executing a context at a producer engine, the executing including updating a memory register; and
   sending a signal from the producer engine to a consumer engine that the memory register has been updated, the signal including a Context ID to identify a context to be executed by the consumer engine to update the register;
   determining at the consumer engine whether the Context ID of the signal matches a Context ID of a context currently being processed at the consumer engine; and
   waiting at the consumer engine if the Context ID of the signal message matches the context currently being processed by the consumer engine.

14. The medium of claim 13, the instructions farther comprising generating the signal to be sent from a producer engine to a consumer engine, the message identifying the consumer engine and a context ID to which the signal is to be applied by the consumer engine.

15. The medium of claim 14, the instructions further comprising generating the Context ID at a scheduler and assigning the Context ID to the consumer engine, the Context ID including an engine ID to identify the consumer engine.

16. An apparatus comprising
   a producer engine to execute a context including updating a memory register and to send a signal to a consumer engine that the memory register has been updated, the signal including a Context ID to identify a context to be executed by the consumer engine to update the register; and
   a consumer engine to receive the signal, to acknowledge the signal to the producer engine, to determine whether the Context ID of the signal matches a Context ID of a context currently being processed, and to wait if the Context ID of the signal messages matches the context currently being processed by the consumer engine.

17. The apparatus of claim 16, wherein the consumer engine is further to fetch data from a memory register for use in executing the context at the consumer engine if the Context ID of the signal message matches the context currently being processed by the consumer engine.

18. A method to synchronize contexts between a producer engine and a consumer engine, the method comprising:
   receiving a signal command having a context ID from the producer engine at the consumer engine;
   executing a command stream of a context corresponding to the context ID at the consumer engine, the command stream having a wait command, the wait command having a semaphore memory address, inline semaphore data and a comparison operator;
   acknowledging the wait command to the producer engine;
   executing the wait command at the consumer engine, by fetching data from the semaphore memory address and comparing the fetched data with the inline semaphore data using the comparison operator;
   executing the next instruction in the command stream of the context if the comparison with the comparison operator is met.

19. The method of claim 18, further comprising waiting for a timer to expire and then after waiting repeating fetching data and comparing if the comparison is not met.

20. The method of claim. 19, wherein waiting comprises waiting to receive a semaphore signal from a producer engine.

21. The method of claim 18, further comprising switching out of the context if the comparison is not met.

22. The method of claim 18, further comprising informing a scheduler if the comparison is not met.

23. The method of claim 22, further comprising updating the wait command in a context scheduler.

24. The method of claim 23, further comprising re-evaluating the wait condition at a scheduler before switching the context of the consumer engine.

25. A non-transitory machine-readable medium having instructions that when executed by the machine cause the machine to perform operations comprising:
receiving a signal command having a context ID from the producer engine at the consumer engine;
executing a command stream of a context corresponding to the context ID at the consumer engine, the command stream having a wait command, the wait command having a semaphore memory address, inline semaphore data and a comparison operator;
acknowledging the wait command to the producer engine;
executing the wait command at the consumer engine by fetching, data from the semaphore memory address and comparing the fetched data with the inline semaphore data using the comparison operator;
executing the next instruction in the command stream of the context if the comparison with the comparison operator is met.

26. The medium of claim 25, the instructions further comprising informing a scheduler if the comparison is not met.

27. The medium of claim 26, the instructions further comprising updating the wait command in a context scheduler.

28. An apparatus comprising:
a memory having addresses;
a command streamer having a command stream for a context; and
as consumer engine to receive a signal command having a context ID from the producer engine, to execute the command stream corresponding to context ID, the command stream having a wait command, the wait command having a semaphore memory address to the memory, inline semaphore data and as comparison operator, the consumer engine further to acknowledge wait command to the producer engine, to execute the wait command by fetching data from the memory at the semaphore memory address and compare the fetched data with the inline semaphore data, the consumer engine further to execute a next instruction in the command stream if the comparison of the comparison operator is met.

29. The apparatus of claim 28, further comprising a scheduler connected to the consumer engine to update the wait command if the comparison is not met.

30. The apparatus of claim 29, the scheduler further re-evaluating the wait condition before switching the context of the consumer engine.

* * * * *